United States Patent
Kim

(10) Patent No.: US 9,445,061 B2
(45) Date of Patent: Sep. 13, 2016

(54) IMAGE SENSORS WITH PIXEL ARRAY SUB-SAMPLING CAPABILITIES

(71) Applicant: Semiconductor Components Industries, LLC, Phoenix, AZ (US)

(72) Inventor: Dongsoo Kim, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 13/965,582

(22) Filed: Aug. 13, 2013

(65) Prior Publication Data

US 2015/0009378 A1    Jan. 8, 2015

Related U.S. Application Data

(60) Provisional application No. 61/843,816, filed on Jul. 8, 2013.

(51) Int. Cl.
*H04N 5/335* (2011.01)
*H04N 9/04* (2006.01)
*H04N 5/347* (2011.01)

(52) U.S. Cl.
CPC ............ *H04N 9/045* (2013.01); *H04N 5/347* (2013.01)

(58) Field of Classification Search
USPC ........................................................ 348/302
See application file for complete search history.

(56) References Cited

U.S. PATENT DOCUMENTS

| | | | |
|---|---|---|---|
| 6,057,539 A * | 5/2000 | Zhou et al. ............... 250/208.1 |
| 7,760,259 B2 | 7/2010 | Moini et al. |
| 2006/0192873 A1* | 8/2006 | Yaffe ........................... 348/297 |
| 2008/0298789 A1* | 12/2008 | Ohki ............................ 396/52 |
| 2008/0316326 A1* | 12/2008 | Wada ......................... 348/222.1 |
| 2010/0309356 A1* | 12/2010 | Ihara et al. ................. 348/300 |
| 2011/0267511 A1* | 11/2011 | Imafuji ............... H04N 5/3696 |
| | | | 348/294 |
| 2012/0162475 A1* | 6/2012 | Lin et al. ................ 348/231.99 |
| 2013/0248684 A1* | 9/2013 | Yun ........................... 250/208.1 |

FOREIGN PATENT DOCUMENTS

| | | |
|---|---|---|
| EP | 0820195 | 9/2003 |
| EP | 0825776 | 9/2003 |
| EP | 1687970 | 6/2013 |

* cited by examiner

*Primary Examiner* — Roberto Velez
*Assistant Examiner* — Stephen Coleman
(74) *Attorney, Agent, or Firm* — Treyz Law Group, P.C.; Jason Tsai; Zachary D. Hadd

(57) ABSTRACT

An image sensor may include an array of image pixels arranged according to a predetermined pattern. A 3-by-3 pixel sub-sampling method is provided that supports a high-speed sub-resolution video mode. The 3-by-3 sub-sampling method may involve organizing the image pixel array into groups, each of which contains a 3-by-3 array of nine pixels. Image pixels at the four corners of each group may be sampled and combined to form a final output. Final outputs produced from each group may form a sub-sampled array that is used by the sub-resolution video mode.

19 Claims, 9 Drawing Sheets

IMAGE SENSORS WITH PIXEL ARRAY SUB-SAMPLING CAPABILITIES

This application claims the benefit of provisional patent application No. 61/843,816, filed Jul. 8, 2013, which is hereby incorporated by reference herein in its entirety.

BACKGROUND

This relates generally to imaging systems, and more particularly, to imaging systems that support pixel sub-sampling video modes.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

Image sensors for which all image pixels in the array are read out are referred to as operating in full resolution mode. To support high-resolution video processing, image sensors are often operated in a reduced resolution or sub-resolution mode in which the amount of data that is read out is only a fraction of the full resolution image size. The sub-resolution mode is implemented via a pixel array sub-sampling technique in which only fraction of the pixels are sampled for readout.

A key mode for high resolution video processing is the 3×3 sub-sampling mode in which the output image data is reduced by a factor of 3 in both the X (horizontal) dimension and the Y (vertical) dimension. A conventional way for implementing 3×3 sub-sampling involves accessing data from every third row (i.e., by ignoring data entirely from the two intervening rows). Skipping two-thirds of the rows in this way may be referred to as Y-Skip3.

In each row that is actually being accessed, data from each pair of adjacent pixels is read out and combined to produce intermediate pixel values. Adjacent pairs of intermediate pixel values may then be combined to produce final pixel values. Each group of six image pixels in a row generates two final pixel values using this approach. Generating two image pixel values for every group of six image pixels in this way may be referred to as X-Bin2 with 1.5 scaling. Implementing 3×3 sub-sampling via the combination of Y-Skip3 and X-Bin2/Scaling-1.5 may cause inaccuracies since two-thirds of the data is thrown out in the Y dimension and image aliasing may result from the X-Bin2 and scaling operation.

It may therefore be desirable to provide improved ways of implementing 3×3 sub-sampling.

DETAILED DESCRIPTION

Electronic devices such as digital cameras, computers, cellular telephones, and other electronic devices include image sensors that gather incoming light to capture an image. The image sensors may include arrays of imaging pixels. The pixels in the image sensors may include photosensitive elements such as photodiodes that convert the incoming light into image signals. Image sensors may have any number of pixels (e.g., hundreds or thousands of pixels or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Figure 1:
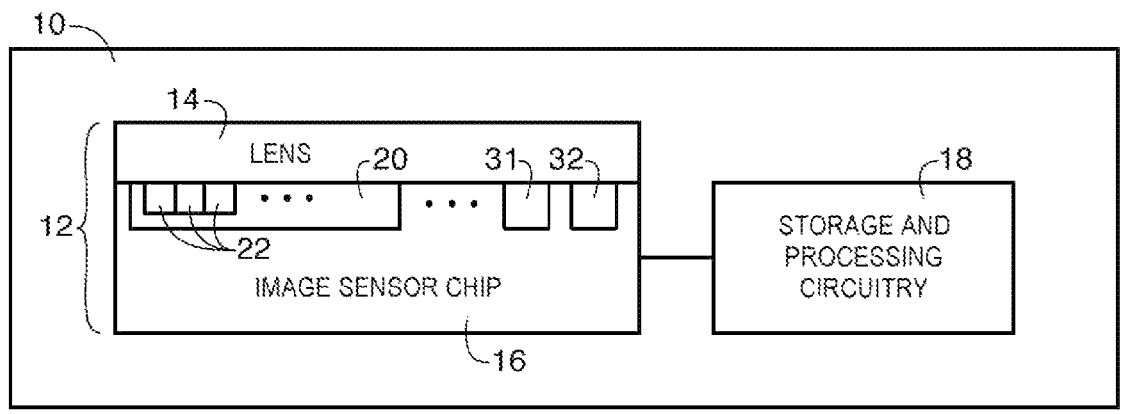
FIG. 1 is a diagram of an illustrative electronic device in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. Image sensor 16 may be an image sensor system-on-chip (SOC) having additional processing and control circuitry such as analog control circuitry 31 and digital control circuitry 32 on a common image sensor integrated circuit die with image pixel array 20.

During image capture operations, light from a scene may be focused onto an image pixel array (e.g., array 20 of image pixels 22) by lens 14. Image sensor 16 provides corresponding digital image data to analog circuitry 31. Analog circuitry 31 may provide processed image data to digital circuitry 32 for further processing. Circuitry 31 and/or 32 may also be used in controlling the operation of image sensor 15. Image sensor 16 may, for example, be a backside illumination image sensor. If desired, camera module 12 may be provided with an array of lenses 14 and an array of corresponding image sensors 16.

Device 10 may include additional control circuitry such as storage and processing circuitry 18. Circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be further processed and/or stored using processing circuitry 18. Processed image data may, if desired, be provided to external equipment (e.g., a computer or other device) using wired and/or wireless communications paths coupled to processing circuitry 18. Processing circuitry 18 may be used in controlling the operation of image sensors 16.

Image sensors 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices.

Figure 2:
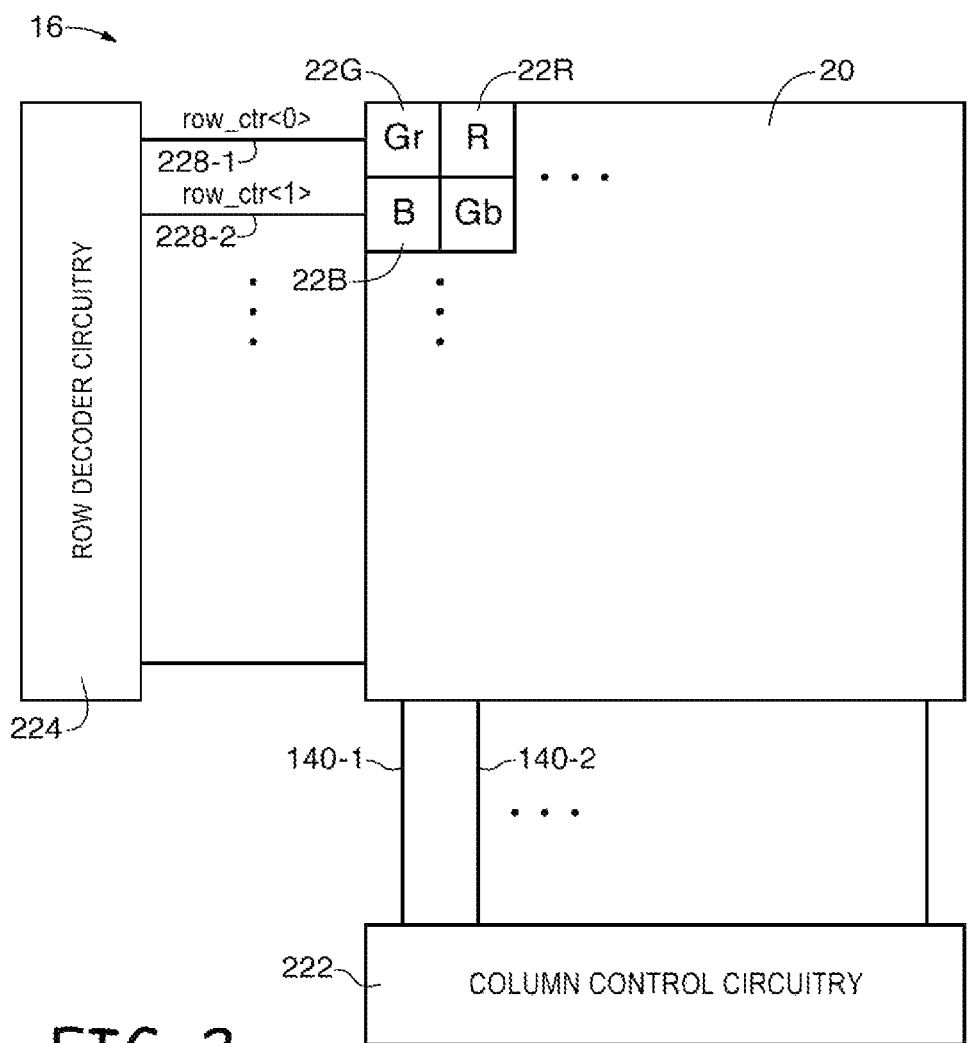
FIG. 2 is a diagram of an illustrative image sensor having an image pixel array and associated row and column control circuitry in accordance with an embodiment of the present invention.

The analog circuitry on image sensor 16 may include control circuitry such as amplifier circuitry and analog-to-digital converter (ADC) circuitry for converting the analog signals generated by pixels 22 into digital signals. As shown in FIG. 2, image sensor 16 may include image sensor pixel array 20 (e.g., an array of image sensor pixels 22 arranged in rows and columns) that is coupled to row decoder circuitry 224 and column control circuitry 222. Row decoder circuitry 224 may receive row addresses and supply corresponding row control signals row_ctr such as pixel reset signals (RST), pixel row-select signals, charge storage gate transfer signals (TX), and other row control signals to image pixels 22 over control paths 228. In the example of FIG. 2, a first row control signal row_ctr<0> may be fed to a first row of image pixels via row line 228-1, a second row control signal row_ctr<0> may be fed to a second row of image pixels via row line 228-2, etc.

Image pixels 22 in each column of image pixel array 20 may be coupled to a corresponding column line 140. For example, image pixels 22 in a first pixel array column may be connected to column readout line 140-1, image pixels 22 in a second pixel array column may be connected to column line 140-2, etc. Column lines 140 may be used for reading out image signals from image pixels 22 and for supplying bias signals (e.g., bias currents or bias voltages) to image pixels 22. During image pixel readout operations, a pixel row in array 20 may be selected using row decoder circuitry 224 and image data associated with image pixels 22 in that pixel row can be read out along column lines 140. Each column line 140 may be coupled to corresponding column control circuitry including column amplifiers, memory circuits, and data converting circuitry, just to name a few.

As shown in FIG. 2, image pixel array 20 may be formed in a Bayer mosaic pattern exhibiting repeating unit cells of two-by-two image pixels. Each unit cell may, for example, include two green pixels 22G (e.g., a green (Gr) pixel formed in a common row with a red pixel and a green (Gb) pixel formed in a common row with a blue pixel) diagonally opposite one another and adjacent to a red (R) pixel 22R diagonally opposite to a blue (B) pixel 22B. However, this is merely illustrative. If desired, other pixel color patterns may be used.

The ability of pixels 22G, 22R, and 22B to receive different colored light may be provided via use of different color filter elements positioned above the image pixels. In particular, a green color filter element that only passes through green light may be positioned over pixels 22G; a red color filter element that only passes though red light may be positioned over pixels 22R; and a blue color filter element that only passes through blue light may be positioned over pixels 22B. In general, other ways of providing color selectivity may be used.

Figure 3:
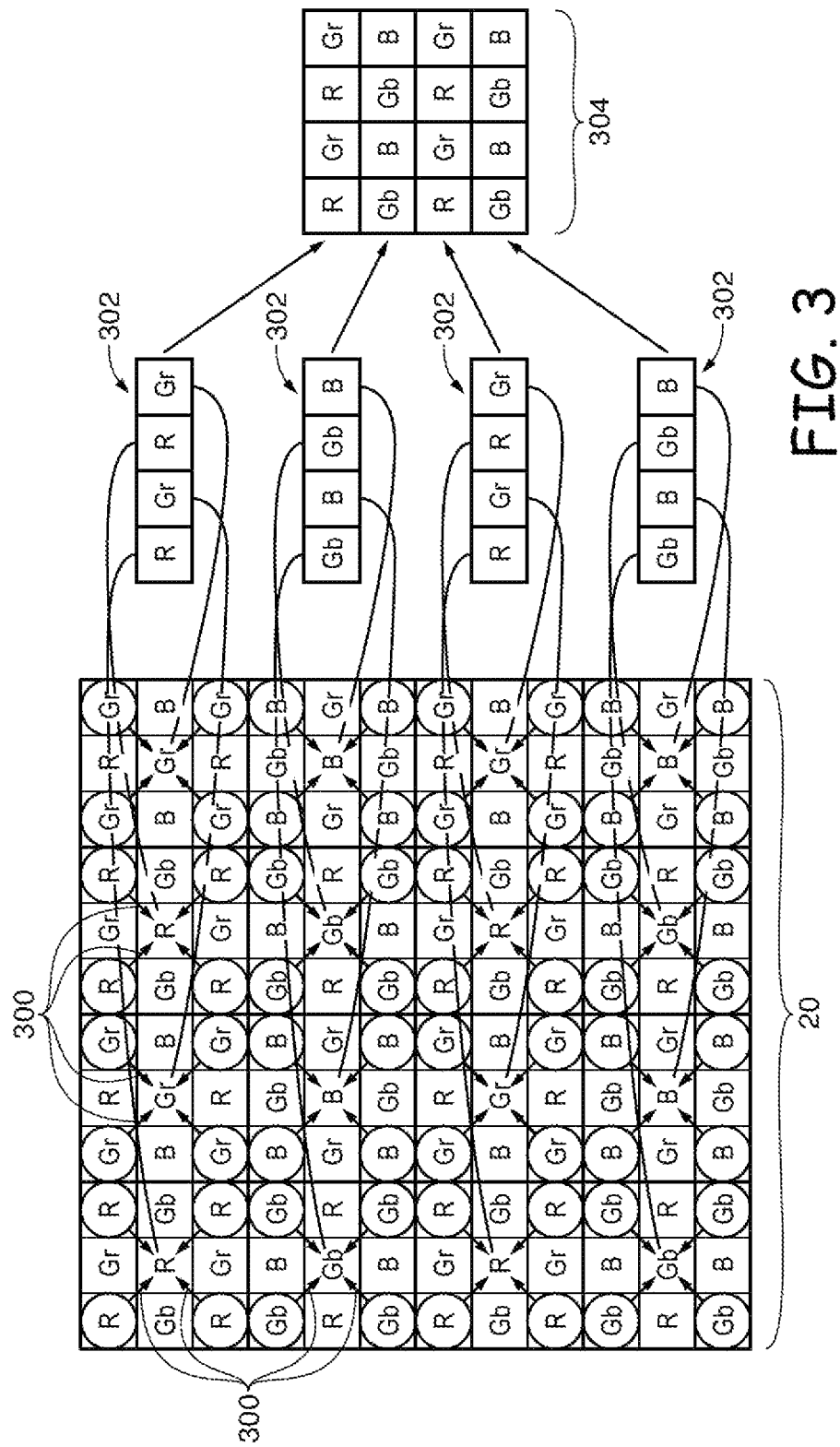
FIG. 3 is a diagram illustrating a 3×3 sub-sampling technique that can be used to preserve the Bayer pattern and spacing uniformity in accordance with an embodiment of the present invention.

In accordance with an embodiment of the present invention, a novel 3×3 sub-sampling method for processing data from image pixel array 20 is provided. FIG. 3 is a diagram illustrating the 3×3 sub-sampling method that preserves the Bayer pattern and spacing uniformity across the entire array 20. As shown in FIG. 3, array 20 may include colored pixels arranged in the Bayer pattern described in connection with FIG. 2. The array may also be divided up into groups of three-by-three image pixels (i.e., array 20 may be organized into groups of nine individual pixels).

There may be at least three different types of groups. A group having green pixels at its corners may be categorized as being the first type. A group having red pixels at its corners may be categorized as being the second type. A group having blue pixels at its corners may be categorized as being the third type. In general, other types of groups having the same color at its four corners may be identified. When processing data from the first group type, the four green pixels at the corners of that group may be read out and combined to form a corresponding combined green output signal. When processing data from the second group type, the four red pixels at the corners of that group may be read out and combined to form a corresponding combined red output signal. When processing data from the third group type, the four blue pixels at the corners of that group may be read out and combined to form a corresponding combined blue output signal.

The combined output signals generated by each row of groups are represented as signals 302 in FIG. 3. Signals 302 generated from each row of groups may serve as the final sub-sampled output signals 304. As illustrated in FIG. 3, the number of output signals 304 has been reduced from the original array size by a factor of three. Sub-sampling array 20 in this way may be referred to as performing X-Bin3 and Y-Bin3 operations. The X-Bin3 operation may refer to "binning" or combining data signals from two out of every three pixels that are arranged along a row. Note that only data signals from non-adjacent columns should be binned together to form the final output signal. The Y-Bin3 operation may refer to combining data signals from two out of every three pixels that are arranged along a column.

Figure 4:
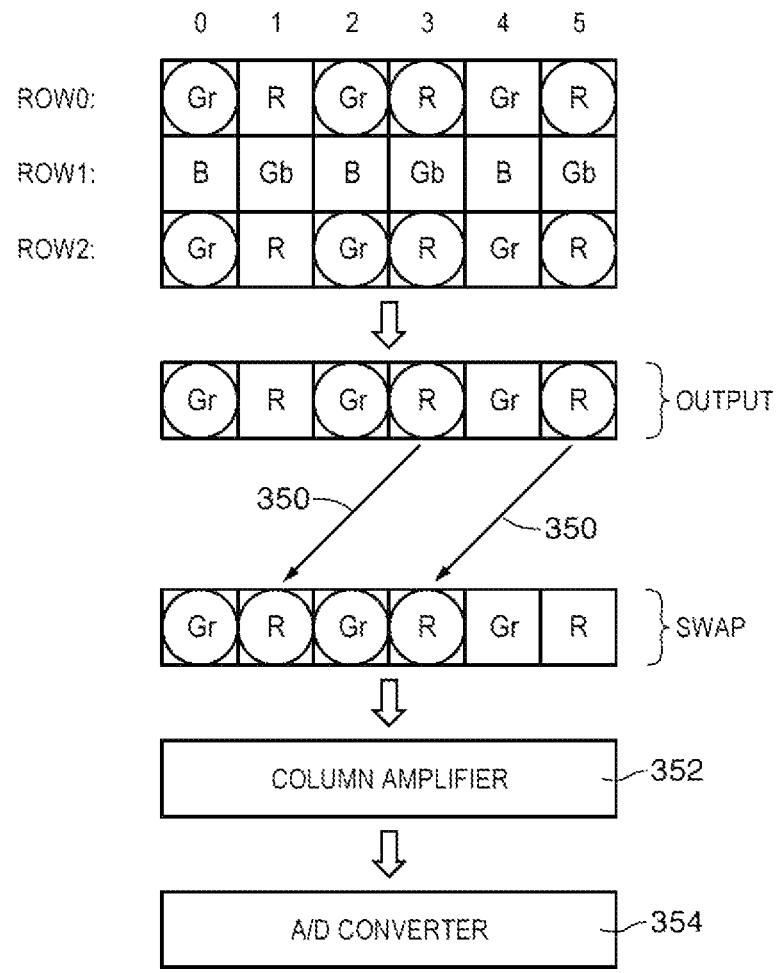
FIG. 4 is a diagram showing how read data can be rearranged before being processed by column control circuitry in accordance with an embodiment of the present invention.

FIG. 4 is a diagram showing two adjacent groups of 3×3 pixels. A first group of the first type may have green image pixels Gr formed at the intersections of rows 0 and 2 and columns 0 and 2, whereas a second group of the second type may have red image pixels R formed at the intersections of rows 0 and 2 and columns 3 and 5. Image pixel signals may be read out from array 20 sequentially on a row-by-row basis. When performing 3×3 sub-sampling using the Y-Bin3 approach, only rows 0 and 2 (and rows 3 and 5, etc.) need to be read (i.e., data from rows 1, 4, 7, 10, need not be read). The image pixels marked with a circle in FIG. 4 are the ones that need to be taken into account using the desired 3×3 sub-sampling method.

The "OUTPUT" in FIG. 4 shows data that has been read from row 0. In particular, data signals Gr-R-Gr-R-Gr-R has been read out from row 0, columns 0-5, respectively. The bolded signals above correspond to the pixels that are relevant and that need to be sampled for the X-Bin3 operation.

Routing circuitry within column control circuitry 222 may subsequently be used to "swap" the positions of at least some of the read data, as indicated by arrows 350. In particular, the swapping operation may effectively shift the relevant signals so that they are all arranged in adjacent columns (e.g., Gr-R-Gr-R may be arranged in columns 0-3, respectively, while the Gr-R signals in columns 4 and 5 are not relevant in computing the final output).

Column amplifiers 352 may receive the rearranged signals and produce corresponding amplified versions of these signals. The amplified signals may then be provided to A/D converting circuits 354 for conversion into digital signals.

There may be one column amplifier and one A/D converter in each column. Rearranging the image signals as described above allows the column control circuitry 222 to only enable the column amplifiers corresponding to the first four columns in each group of six columns while deactivating the two remaining column amplifiers corresponding to the last two columns in each group of six columns (e.g., column amplifiers in columns 0-3 may be switched into use while column amplifiers in columns 4 and 5 may be switched out of use). Note that in the six columns shown in FIG. 4, three of the column amplifiers (in columns 0, 2, and 4) may be used for amplifying green pixel signals, whereas the other three of the column amplifiers (in columns 1, 3, and 5) may be used for amplifier green pixel signals. As described above, the swapping operation allows one of the three column amplifiers processing the green pixel signals to be idle and one of the three column amplifiers processing the red pixel signals to be idle.

The discussion of FIG. 4 relates only to the first and second types of groups. This is merely illustrative. In general, the principles described above in connection with FIG. 4 may apply to the third type of group in which blue pixel signals are being processed. Referring back to FIG. 3, blue and green alternating pixels may be processed based on pixels in rows 3-5. Processing groups of 3-by-3 image pixels in this may be extended across the entire array 20.

Figure 5:
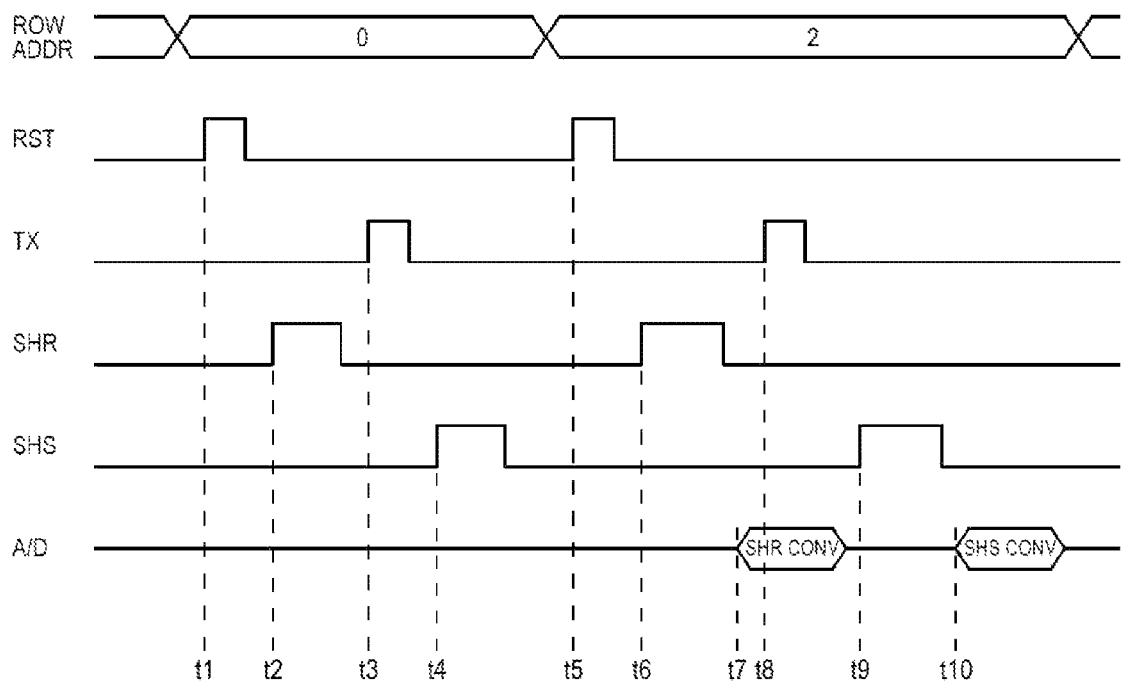
FIG. 5 is a timing diagram showing illustrative waveforms associated with performing 3×3 sub-sampling in accordance with an embodiment of the present invention.

FIG. 5 is a timing diagram showing illustrative waveforms relevant to the 3×3 sub-sampling operation. During a first time period, data may be read from a first image pixel in a first row (e.g., row 0). At time t1, a reset signal RST may be pulsed high to reset a sense node in the first image pixel. The sense node (sometimes referred to as the floating diffusion node) may serve as a temporary storage node for the image pixel and may exhibit a potential level that directly affects the output value that is read out from the image pixel.

At time t2, a sample-and-hold reset signal SHR representing a reset signal value of the floating diffusion (FD) node of the first image pixel may be read out and held at a first storage element. At time t3, a transfer signal TX in row 0 may be pulsed high to transfer any charge that has accumulated in the photodiode of the first image pixel since the last charge transfer operation to the floating diffusion node. Doing so may change the potential level of the floating diffusion node from the reset level by an amount that is proportional to the amount of charge that is currently being transferred.

At time t4, a sample-and-hold image signal SHS representing an image signal value of the floating diffusion (FD) node of the first image pixel may be read out and held at a second storage element. At this point, even though SHR and SHS of the first pixel have been sampled and stored, data from a second pixel in another row can be read out prior to performing A/D conversion on the reset and image signal values obtained from the first image pixel. Doing so allows the pixel signals from multiple rows to be combined (or "binned" together) prior to conversion.

During a second time period, data may be read out from a second image pixel in a second row (e.g., row 2). Note that row 1 has been skipped since the Y-Bin3 operation ignores every other row (see, e.g., FIG. 4). Referring back to FIG. 5, reset signal RST may be pulsed high to reset the floating diffusion node in the second image pixel (at time t5). At time t6, signal SHR associated with the second pixel may be read out from the FD node of the second image pixel and temporarily held at a third storage element.

At this time, the reset value of the first pixel that is held in the first storage element and the reset value of the second pixel that is held in the third storage element can be combined and converted into a combined digital reset signal (as indicated as SHR conversion at time t7).

Sometime during the SHR conversion (e.g., at time t8), a charge transfer signal TX in row 2 may be pulsed high to transfer any charge that has accumulated in the photodiode of the second image pixel since the last charge transfer operation to the floating diffusion node of the second image pixel. Doing so may change the potential level at the FD node of the second image pixel from the reset level by an amount that is proportional to the amount of charge that is currently being transferred.

At time t9, signal SHS associated with the second image pixel may be read out and temporarily held at the first storage element. The reset value that was previously stored in the first storage element was processed at time t7 and thus can be overwritten. If desired, the image signal value of the second pixel can also be stored in the third storage element or any available storage element other than the second storage element.

At this time, the image signal value of the first pixel that is held in the second storage element and the image signal value of the second pixel that is held in the first storage element can be combined and converted into a combined digital image signal (indicated as SHS conversion at time t10). The combined digital reset signal and the combined digital image signal may then be used to compute a final output signal. For example, the final output signal may be obtained by calculating the difference between the combined digital reset signal and the combined digital image signal. Computing output signals in this way is sometimes referred to as performing correlated double sampling (CDR).

In describing FIG. 5, operations involving only two image pixels along a given column are discussed. When performing 3-by-3 sub-sampling, however, data from two additional image pixels along a second column needs to be combined with data of the two image pixels from the given column in order to achieve X-Bin3. In other words, the four image pixels at the corners of each group of nine pixels discussed in connection with FIG. 3 needs to be combined prior to conversion.

Figure 6A:
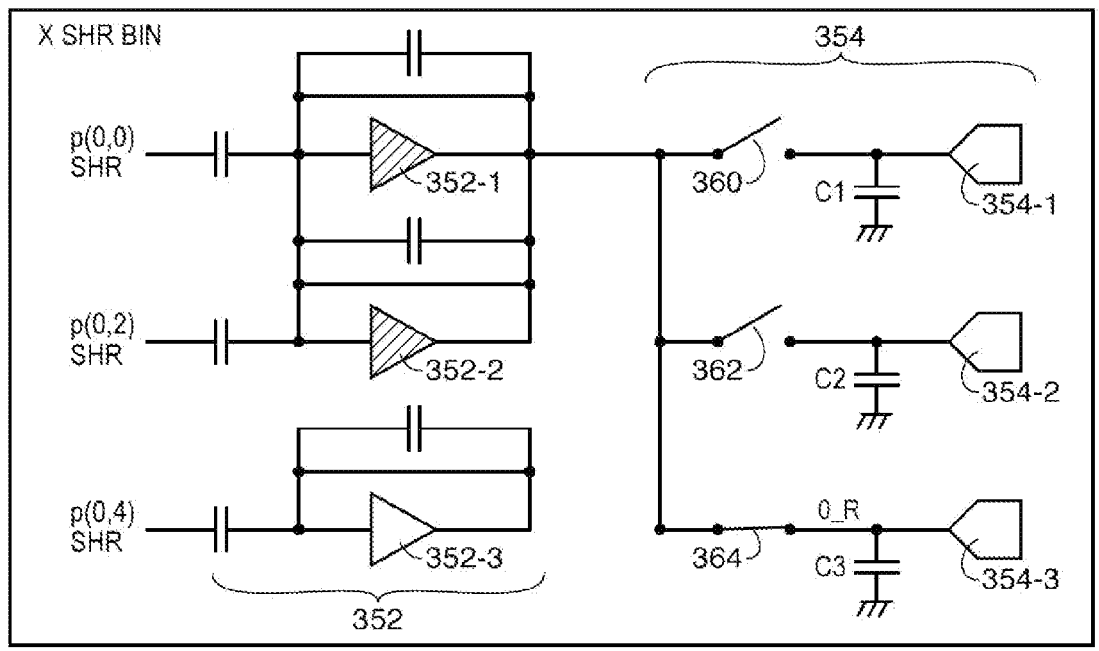
FIGS. 6A-6F are diagrams showing column control circuitry configured in various arrangements in different phases of the sub-sampling operation of FIG. 5 in accordance with an embodiment of the present invention.

FIGS. 6A-6F are diagrams showing how column control circuitry 222 may be configured to support different phases of the 3×3 sub-sampling method in accordance with an embodiment of the present invention. As shown in FIG. 6A, column amplifier circuitry 352 may include at least a first column amplifier 352-1 operable to receive signals from a selected pixel in column 0, a second column amplifier 352-2 operable to receive signals from a selected pixel in column 2, and a third column amplifier 352-3 operable to receive signals from a selected pixel in column 4. Column amplifiers 352-1 and 352-2 may be used to amplify signals from relevant green pixels in columns 0 and 2 while amplifier 353-3 in column 4 is switched out of use (see, the example of FIG. 4 in which only the green pixels in columns 0 and 2 are being binned together).

FIG. 6A shows a first operational phase (or time period) during which amplifier 352-1 receives a reset signal SHR from pixel p(0,0) (i.e., a pixel in row 0, column 0), amplifier 352-2 receives a reset signal from pixel p(0,2) (i.e., a pixel in row 0, column 2), and amplifier 352-3 receives a reset signal from pixel p(0,4) (i.e., a pixel in row 0, column 4). Column control circuitry 222 may include switching and routing circuitry operable to couple together any number of column amplifiers 352 and further operable to couple any one of column amplifiers 352 to a selected portion of data conversion circuitry 354 (e.g., A/D converters 354-1, 354-2, and 354-3). For example, data converter 354-1 may be coupled to column amplifiers 352 via a first switch 360; data converter 354-2 may be coupled to column amplifiers 352 via a second switch 362; and data converter 354-3 may be coupled to column amplifiers 352 via a third switch 364.

During the first phase, column amplifiers 352-1 and 352-2 may be coupled together so that the reset signals from p(0,0) and p(0,2) may be combined and fed to capacitor C3 at the input of converter 354-3 by closing switch 364 (i.e., switches 354-1 and 354-2 may be turned off). The combined reset signal of these green pixels in row 0 (labeled as signal 0_R in FIG. 6A) may be equal to an amplified version of the average of the reset signals obtained from p(0,0) and p(0,2). The first phase may correspond to the time period immediately following time t2 in FIG. 5.

Figure 6B:
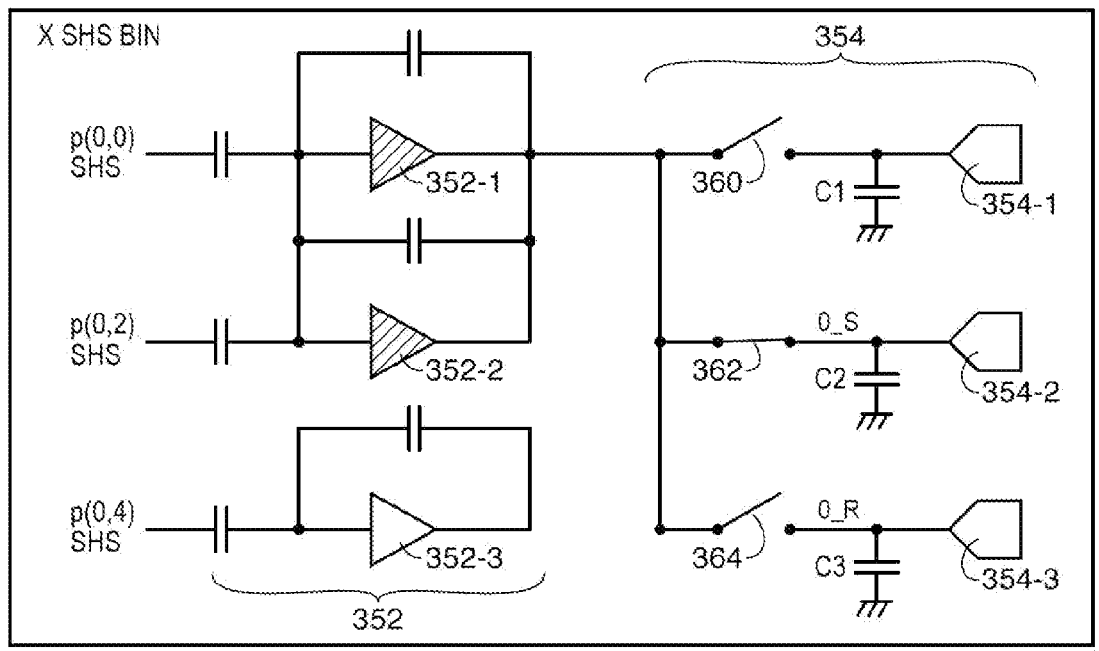

FIG. 6B shows a second operational phase during which amplifier 352-1 receives an image signal SHS from p(0,0), amplifier 352-2 receives an image signal from p(0,2), and amplifier 352-3 receives an image signal from p(0,4). During this time, column amplifiers 352-1 and 352-2 may be coupled together so that the image signals from p(0,0) and p(0,2) may be combined and fed to capacitor C2 at the input of converter 354-2 by closing switch 362 (i.e., switches 354-1 and 354-3 may be turned off). The combined image signal of these green pixels in row 0 (labeled as signal 0_S in FIG. 6B) may be equal to an amplified version of the average of the image signals obtained from p(0,0) and p(0,2). The second phase may correspond to the time period immediately following time t4 in FIG. 5.

Figure 6C:
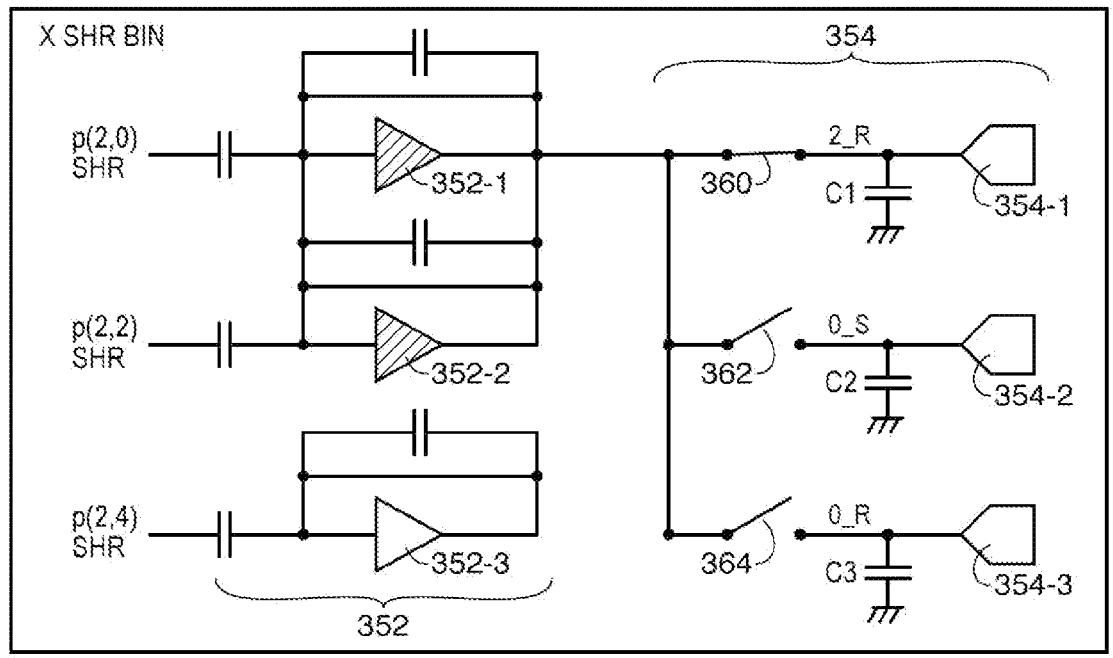

FIG. 6C shows a third operational phase during which amplifier 352-1 receives a reset signal SHR from p(2,0) (i.e., a pixel in row 2, column 0), amplifier 352-2 receives a reset signal from p(2,2) (i.e., a pixel in row 2, column 2), and amplifier 352-3 receives an image signal from p(2,4) (i.e., a pixel in row 2, column 4). Note that a new row such as row 2 has been addressed while skipping intermediate row 1 to implement Y-Bin3 (e.g., only data from non-adjacent rows should be combined in the Y-Bin3 approach). During this time, column amplifiers 352-1 and 352-2 may be coupled together so that the reset signals from p(2,0) and p(2,2) may be combined and fed to capacitor C1 at the input of converter 354-1 by closing switch 360 (i.e., switches 354-2 and 354-3 may be turned off). The combined reset signal of these green pixels in row 2 (labeled as signal 2_R in FIG. 6C) may be equal to an amplified version of the average of the reset signals obtained from p(2,0) and p(2,2). The third phase may correspond to the time period immediately following time t6 in FIG. 5.

Figure 6D:
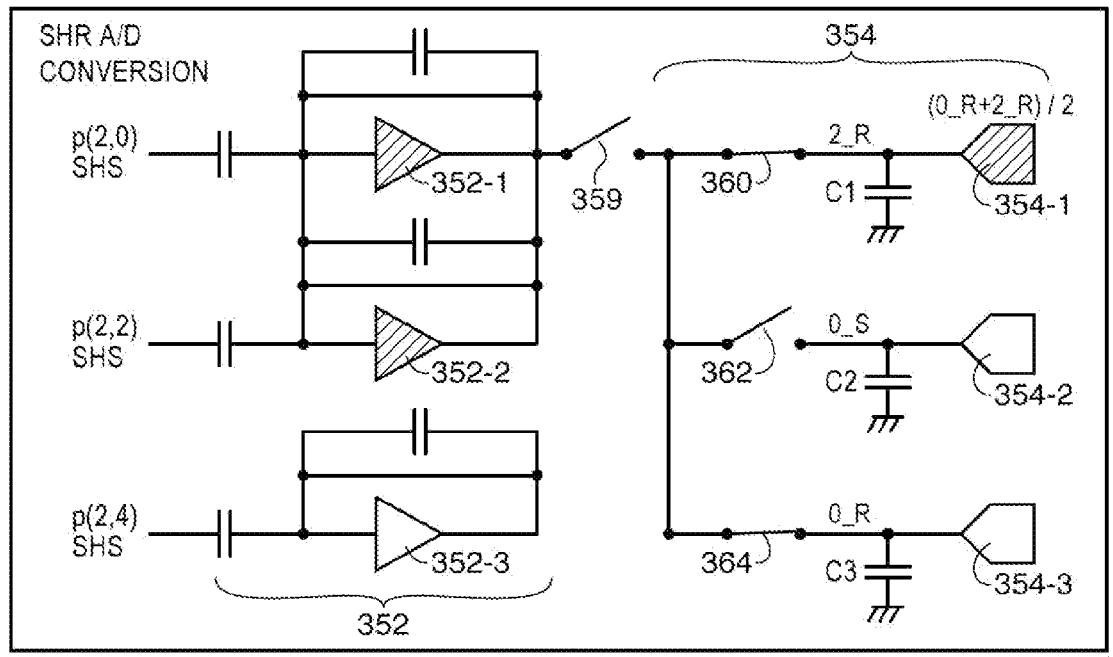

FIG. 6D shows a fourth operational phase during which amplifier 352-1 receives an image signal SHS from p(2,0), amplifier 352-2 receives an image signal from p(2,2), and amplifier 352-3 receives an image signal from p(2,4). During this time, column amplifiers 352 may be decoupled from data converters 354 (e.g., by temporarily breaking routing path 359). While path 359 is broken, sample-and-held reset signals 0_R and 2_R may be combined by closing switches 360 and 364, and the combined reset signal may then be converted to digital signals using only first data converter 354-1 (i.e., converters 354-2 and 354-3 may be idle). The digital output signal generated in this way may be equivalent to the average of signals 0_R and 2_R. The fourth phase may correspond to the time period immediately following time t7 in FIG. 5.

Figure 6E:
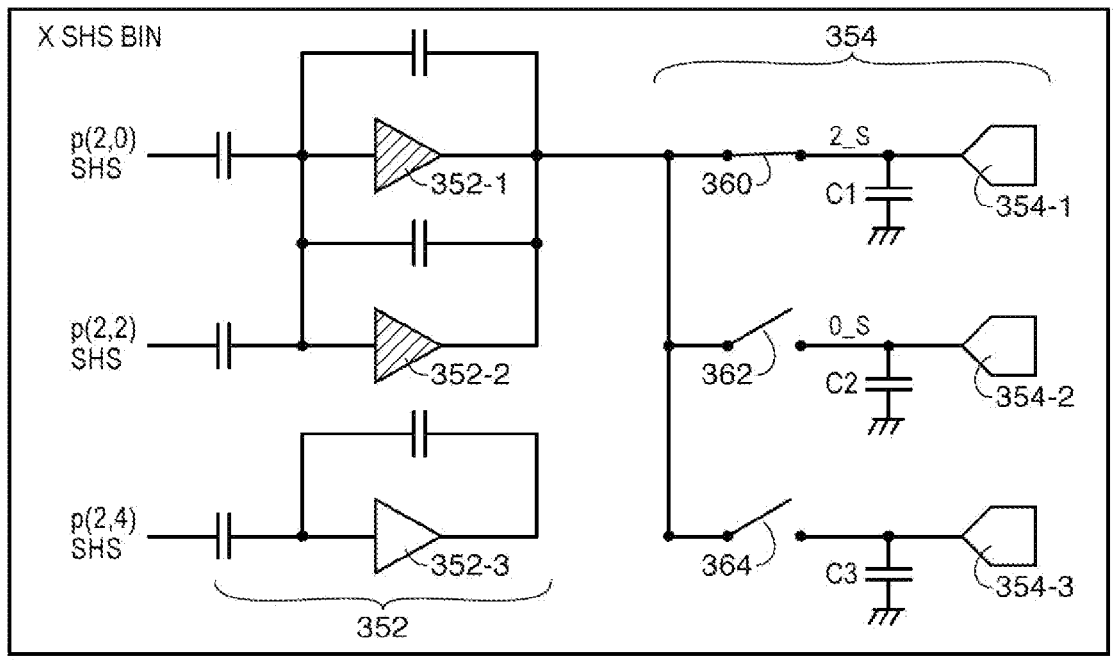

FIG. 6E shows a fifth operational phase during which routing path 359 has been reestablished so that the image signals can be passed through to one of the data converters. During the fifth phase, column amplifiers 352-1 and 352-2 may be coupled together so that the image signals from p(2,0) and p(2,2) may be combined and fed to capacitor C1 at the input of converter 354-1 by closing switch 360 (i.e., switches 354-2 and 354-3 may be turned off).

The combined image signal of these green pixels in row 2 (labeled as signal 2_S in FIG. 6E) may be equal to an amplified version of the average of the image signals obtained from p(2,0) and p(2,2). The fifth phase may correspond to the time period immediately following time t9 in FIG. 5.

Figure 6F:
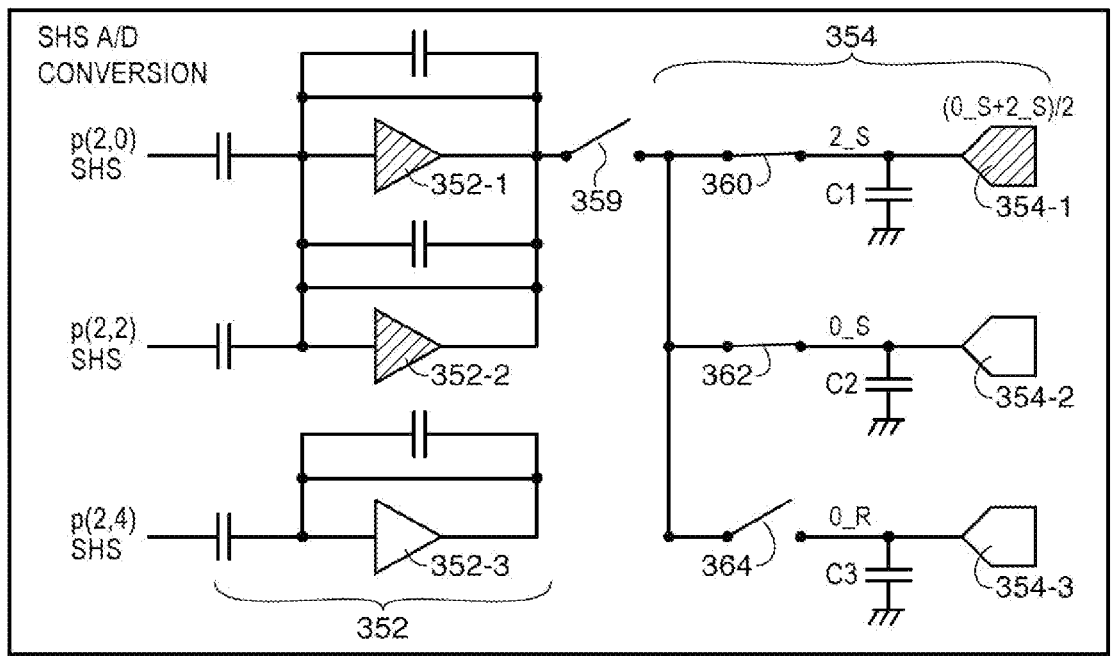

FIG. 6F shows a sixth operational phase during which column amplifiers 352 is decoupled from data converters 354 (e.g., by opening a switch at junction 359). While path 359 is open, sample-and-held image signals 0_S and 2_S may be combined by closing switches 360 and 362; the combined image signal may then be converted to digital signals using only first data converter 354-1 while converters 354-2 and 354-3 are inactive. The digital output signal generated in this way may be equivalent to the average of signals 0_S and 2_S. The sixth phase may correspond to the time period immediately following time t10 in FIG. 5.

At the end of the six phases, the digital reset signal generated during the fourth phase and the digital image signal generated during the sixth phase may be used to compute a final output signal (e.g., by calculating the difference between the digital reset signal and the digital image signal). The final output signal generated in this way may represent one sub-sampled pixel output signal 304 described in connection with FIG. 3.

The example of FIG. 3 shows only amplifiers 352 that are associated with columns 0, 2, and 4 and that are used to process green pixels. This is merely illustrative. Amplifiers 352 in other columns such as columns 1, 3, and 5 may be used to process red pixels (see, e.g., FIG. 4), blue pixels, or other types of pixels. In general, the arrangements in FIGS. 6A-6F may be used to process signals from pixels of any color from every other column (to support X-Bin3) and from every other row (to support Y-Bin3) in array 20.

Figure 7:
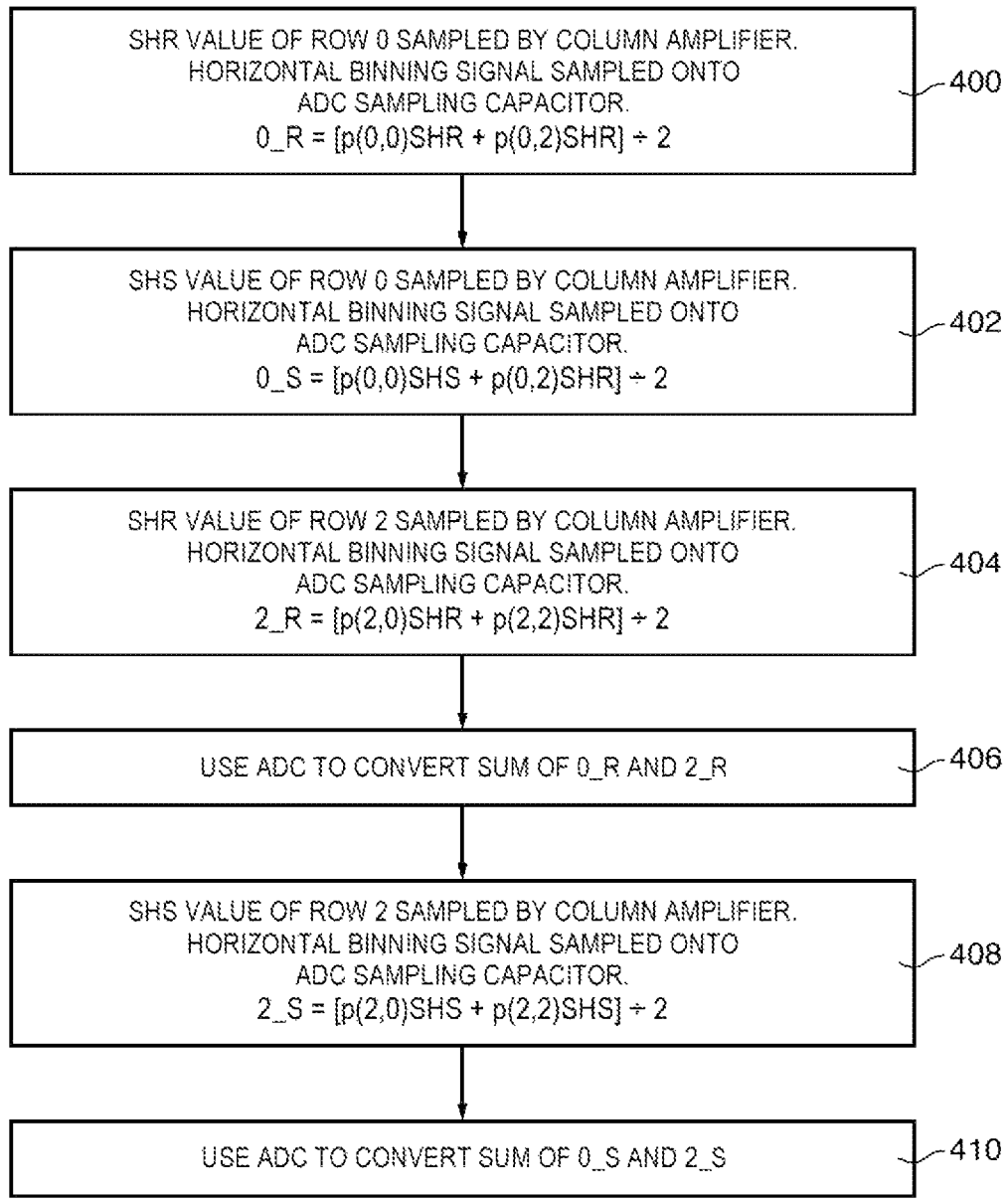
FIG. 7 is a flow chart of illustrative steps for performing 3×3 sub-sampling in accordance with an embodiment of the present invention.

FIG. 7 is a flow chart of illustrative steps involved in performing the 3×3 sub-sampling operation illustrated in FIGS. 5 and 6. At step 400, reset values SHR from row 0 may be sampled by corresponding column amplifiers. These sampled signals may be held temporarily at the input capacitors (sometimes referred to as ADC sampling capacitors) of a first group of A/D converters 354. For example a reset signal O_R may be computed by taking the average of the reset signal from p(0,0) and the reset signal from p(0,2). Step 400 may correspond to FIG. 6A.

At step 402, the signal values SHS from row 0 may be sampled by the corresponding column amplifiers. These sampled signals may be held temporarily at the input capacitors of a second group of A/D converters 354. For example, an image signal 0_S may be computed by taking the average of the image signal from p(0,0) and the image signal from p(0,2). Step 402 may correspond to FIG. 6B.

At step 404, reset values SHR from row 2 may be sampled by the corresponding column amplifiers. These sampled signals may be held temporarily at the input capacitors of a third group of A/D converters 354. For example, a reset signal 2_R may be computed by taking the average of the reset signal from p(2,0) and the reset signal from p(2,2). Step 404 may correspond to FIG. 6C.

At step 406, selected A/D converters 354 may be used to convert the sum of the signals generated from steps 400 and 404. A division of two may be built into the digital conversion or may be applied after conversion. A digital reset signal may be generated in this way. Step 406 may correspond to FIG. 6D.

At step 408, image values SHS from row 2 may be sampled by the corresponding column amplifiers. These sampled signals may be held temporarily at the input capacitors of the first group of A/D converters 354. For example, an image signal 2_S may be computed by taking the average of the image signal from p(2,0) and the image signal from p(2,2). Step 408 may correspond to FIG. 6E.

At step 410, selected A/D converters 354 may be used to convert the sum of the signals generated from steps 402 and 408. A division of two may be built into the digital conversion or may be applied after conversion. A digital image signal may be generated in this way. Step 410 may correspond to FIG. 6F. A final pixel output may then be computed based on the digital reset and image signals.

The steps of FIG. 7 are merely illustrative and do not serve to limit the scope of the present invention. If desired, the steps of FIG. 7 may be used to generate digital signals for each group of 3×3 image pixels across the entire image pixel array. Implementing 3-by-3 sub-sampling using this approach reduces undesired demosaic artifacts without introducing extraneous control circuitry that is otherwise not needed for normal operation of the image sensor.

Figure 8:
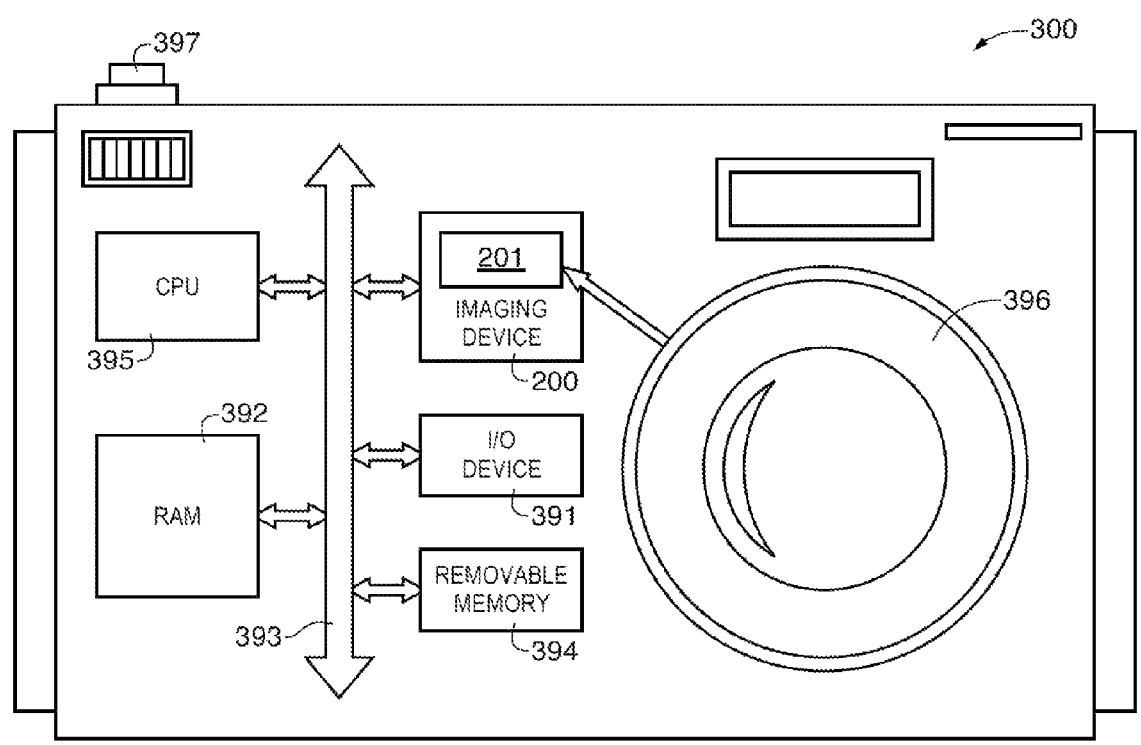
FIG. 8 is block diagram of a processor system that may employ some of the embodiments of FIGS. 2-7 in accordance with an embodiment of the present invention.

FIG. 8 shows in simplified form a typical processor system 300, such as a digital camera, which includes an imaging device 200 (e.g., an imaging device 200 such as imaging sensor 16 that includes column control circuitry 222 operable to implement the 3×3 sub-sampling operation described in FIGS. 3-7). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300, for example a digital still or video camera system, generally includes a lens 396 for focusing an image on pixel array 100 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating imaging systems with 3×3 sub-sampling capabilities. A system may include an image sensor module with an array of image sensor pixels and one or more lenses that focus light onto the array of image sensor pixels (e.g., image pixels arranged in rows and columns).

The image sensor may also include a plurality of column amplifiers operable to produce first reset signals during a first time period, to produce first image signals during a second time period, to produce second reset signals during a third time period, and to produce second image signals during a fourth time period in that order. The first reset signals may be generated using column amplifiers in non-adjacent columns. The first reset signals and the second reset signals may correspond to reset data accessed from the image sensor pixels in non-adjacent rows. Similarly, the first image signals may be generated using column amplifiers in non-adjacent columns. The first image signals and the second image signals may correspond to image data accessed from the image sensor pixels in non-adjacent rows.

The image sensor may further include a data converter operable to produce a digital reset signal by converting a first combined signal that includes both the first and second reset signals during a fifth time period that occurs after the third time period and before the fourth time period and to produce a digital image signal by converting a second combined signal that includes both the first and second image signals during a sixth time period that occurs after fourth time period. A final output signal may then be computed based on the digital reset signal and the digital image signal (e.g., by calculating the difference between the digital reset signal and the digital image signal).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an image sensor having an array of image sensor pixels, comprising:
   reading data from a first plurality of image sensor pixels arranged along a first row in the array;
   reading data from a second plurality of image sensor pixels arranged along a second row in the array, wherein at least one image sensor pixel in the first plurality of image sensor pixels and at least one image sensor pixel in the second plurality of image sensor pixels are arranged along a common column in the array; and
   producing an output signal by combining the data read from the first plurality of image sensor pixels with the data read from the second plurality of image sensor pixels, wherein the data from the first and second pluralities of image sensor pixels are read without reading any data from a third plurality of image sensor pixels arranged along a third row in the array that is interposed between the first and second rows, and wherein the first, second, and third pluralities of image sensor pixels form a three-by-three group of image sensor pixels in the array.

2. The method defined in claim 1, further comprising:
   with a data converting circuit, converting the output signal into digital data.

3. The method defined in claim 1, wherein reading data from the first plurality of image sensor pixels comprises reading data from first and second image sensor pixels that are formed in non-adjacent columns.

4. The method defined in claim 1, further comprising:
   storing the data read from the first plurality of image sensor pixels in a first storage element;
   storing the data read from the first plurality of image sensor pixels in a second storage element, wherein producing the output signal comprises combining the data stored in the first storage element with the data stored in the second storage element.

5. The method defined in claim 1, wherein producing the output signal comprises producing a reset output signal, the method further comprising:

reading additional data from the first plurality of image sensor pixels arranged along the first row in the array;

reading additional data from the second plurality of image sensor pixels arranged along the second row in the array; and producing an image output signal by combining the additional data read from the first plurality of image sensor pixels with the additional data read from the second plurality of image sensor pixels.

6. The method defined in claim 5, further comprising:

generating a final output signal based on the reset output signal and the image output signal.

7. A method for operating an image sensor having an array of image sensor pixels arranged in rows and columns, comprising:

during a first time period, generating a first set of signals using a plurality of column amplifiers in non-adjacent columns, wherein the first set of signals comprises a first signal generated by a first image sensor pixel in a first row of the array and a second signal generated by a second image sensor pixel in the first row of the array;

during a second time period, generating a second set of signals using the plurality of column amplifiers, wherein the second set of signals comprises a third signal generated by a third image sensor pixel in a second row of the array and a fourth signal generated by a fourth image sensor pixel in the second row of the array; and during a third time period, generating a combined signal by combining the first, second, third, and fourth signals and converting the combined signal with a data converter.

8. The method defined in claim 7, wherein the first set of signals and the second set of signals correspond to data accessed from image sensor pixels in non-adjacent rows.

9. The method defined in claim 7, further comprising:

swapping positions of the first signals so that the first signals are arranged in adjacent columns.

10. The method defined in claim 7, wherein generating the combined signal comprises generating a combined reset signal, and wherein converting the combined signal comprises converting the combined reset signal to produce a digital reset signal.

11. The method defined in claim 10, further comprising:

during a fourth time period, generating a third set of signals using the plurality of column amplifiers;

during a fifth time period, generating a fourth set of signals using the plurality of column amplifiers; and during a sixth time period, generating a combined image signal by combining the third and fourth sets of signals and converting the combined image signal to produce a digital image signal.

12. The method defined in claim 11, further comprising: computing an output signal based on the digital reset signal and the digital image signal.

13. The method defined in claim 11, wherein the fourth time period occurs after the first time period and before the second time period, and wherein the third time period occurs after the second time period.

14. A system, comprising:

a central processing unit;

memory;

a lens;

input-output circuitry; and an imaging device, wherein the imaging device comprises:

an image sensor comprising:

a plurality of image sensor pixels that are arranged in rows and columns and that generate image signals;

a plurality of column amplifiers, wherein a given column amplifier in the plurality of column amplifiers corresponds to a given column of image sensor pixels and receives the image signals generated by the given column of image sensor pixels, wherein the given column amplifier produces first signals based on the received image signals during a first time period and produces second signals based on the received image signals during a second time period that is different than the first time period;

routing circuitry that is configured to shift the image signals generated by the given column of image sensor pixels to a column amplifier that corresponds to a column of image sensor pixels other than the given column; and a data converter operable to convert a combined signal that includes both the first and second signals, wherein the combined signal is used to generate an image based on a sub-sampling of the plurality of pixels.

15. The system defined in claim 14, further comprising: switching circuitry operable to couple the plurality of column amplifiers to the data converter.

16. The system defined in claim 14, wherein the first signals are generated using column amplifiers in non-adjacent columns.

17. The system defined in claim 14, wherein the first and second signals correspond to data accessed from image sensor pixels in non-adjacent rows.

18. The system defined in claim 14, wherein the plurality of image sensor pixels form an array having a first resolution, and wherein the image generated based on the sub-sampling of the plurality of image sensor pixels has a second resolution that is less than the first resolution.

19. The system defined in claim 14, wherein generating the image based on the sub-sampling comprises generating the combined signal for only a subset of the image sensor pixels.

* * * * *